(12) United States Patent
Yang (10) Patent No.: US 11,036,971 B2
(45) Date of Patent: Jun. 15, 2021

(54) FACE RECOGNITION METHOD AND ELECTRONIC DEVICE EMPLOYING THE METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chin-Wei Yang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 74 days.

(21) Appl. No.: 16/599,702

(22) Filed: Oct. 11, 2019

(65) Prior Publication Data

US 2020/0387694 A1 Dec. 10, 2020

(30) Foreign Application Priority Data

Jun. 6, 2019 (CN) .......................... 201910492821.4

(51) Int. Cl.
*G06K 9/00* (2006.01)
(52) U.S. Cl.
CPC ............................. *G06K 9/00288* (2013.01)

(58) Field of Classification Search
CPC combination set(s) only.
See application file for complete search history.

(56) References Cited

U.S. PATENT DOCUMENTS

| 9,530,045 | B2 * | 12/2016 | Wang | ................. | G06K 9/00248 |
| 2015/0016687 | A1 * | 1/2015 | Wang | ................. | G06K 9/00248 |
| | | | | | 382/103 |
| 2020/0387694 | A1 * | 12/2020 | Yang | .................... | G06K 9/4642 |

* cited by examiner

*Primary Examiner* — Iman K Kholdebarin
(74) *Attorney, Agent, or Firm* — ScienBiziP, P.C.

(57) ABSTRACT

A method for recognizing, identifying, and authenticating persons to be identified from their faces in a preset scenario, includes uploading a first image of users to a server, and receiving the first image on which first facial rectangles and user information have been imposed, and capturing a second image and detecting second facial rectangles therefrom. The method determines whether a number of faces of the second image is equal to a number of faces of the first image, and uploading the second image to the server for identifying third facial rectangles of the second image. A plurality of distances is obtained by calculating at least one distance between third and second facial rectangles of each user shown in the second image and determining whether the users shown in the second image are the same as users shown in the first image based on the plurality of distances.

15 Claims, 4 Drawing Sheets

FACE RECOGNITION METHOD AND ELECTRONIC DEVICE EMPLOYING THE METHOD

FIELD

The subject matter herein generally relates to face recognition technology.

BACKGROUND

Image recognition is more and more widely used. For example, face image recognition is applied to access control systems, attendance systems, point-of-sale systems, and conference room systems. However, the application of the technology is not done with optimal efficiency.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

Figure 1:
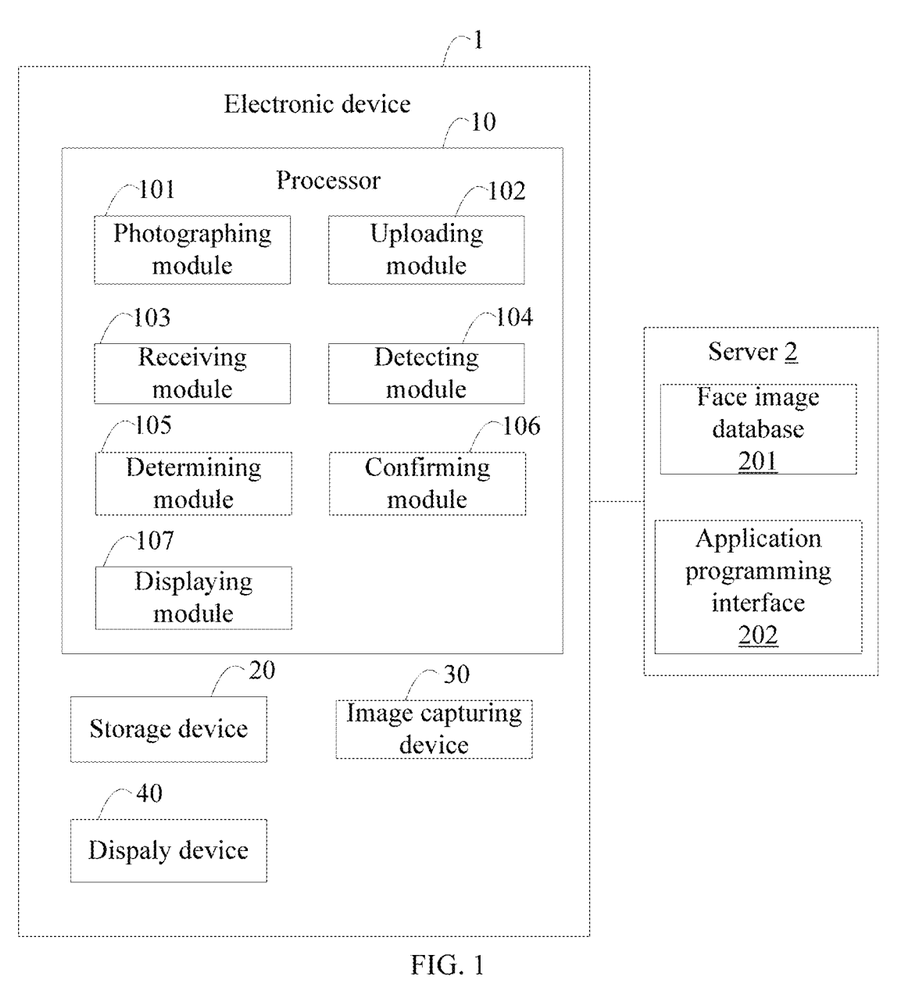
FIG. 1 is a block diagram of one embodiment of an electronic device.

FIG. 1 shows one embodiment of an electronic device (electronic device 1). In at least one embodiment, the electronic device 1 is communicating with a server 2. The electronic device 1 can capture an image of a user and identify user based on the captured image and image recognition service provided by the server 2. The electronic device 1 can be a smart phone or a personal computer. The server 2 can be a single server, a cloud server, or a server cluster providing image recognition services.

In at least one embodiment, the electronic device 1 can include, but is not limited to, at least one processor 10, a storage device 20, an image capturing device 30, and a display device 40. The storage device 20, at least one processor 10, and the first communication device 30 communicate with each other through a system bus.

In at least one embodiment, the storage device 20 can be an internal storage device, such as a flash memory, a random access memory (RAM) for temporary storage of parameters, and/or a read-only memory (ROM) for permanent storage of parameters. The storage device 20 can also be an external storage device, such as an external hard disk, a storage card, or a data storage medium. The at least one processor 10 can be a central processing unit (CPU), a microprocessor, or other data processor chip that performs functions of the electronic device 1.

In at least one embodiment, the image capturing device 30 is a camera built into the electronic device 1. In other embodiments, the image capturing device 30 is a separate camera, which is connected with the electronic device 1. For example, the image capturing device 30 is connected with the electronic device 1 by a universal serial bus (USB) cable or wirelessly.

In at least one embodiment, the display device 40 is a liquid crystal display (LCD) device or an organic light-emitting diode (OLED) display device.

In at least one embodiment, the server 2 can include, but not limited to, a face image database 201, and an application programming interface (API) 202. The electronic device 1 is wirelessly connected to the server 2 via the Internet or WI-FI.

In at least one embodiment, the processor 10 as shown in FIG. 1 can include, but is not limited to, a photographing module 101, an uploading module 102, a receiving module 103, a detecting module 104, a determining module 105, a confirming module 106, and a displaying module 107. The modules 101-107 can comprise computerized instructions in the form of one or more computer-readable programs that can be stored in a non-transitory computer-readable medium, for example in the storage device 20, and executed by the processor 10 of the electronic device 1.

In at least one embodiment, the photographing module 101 can control the image capturing device 30 to capture images at intervals. The person to be identified (identifiable user, or user) is in front of the electronic device 1. For example, the interval is five minutes. In other embodiments, the interval can be set to other time according to requirements.

In at least one embodiment, the electronic device 1 can be used in a preset scenario. The preset scenario can be one needing continuous identification of one or more users. For example, the preset scenario can be a video conference. Then, using the electronic device 1 can prevent an unauthorized user from getting information about the video conference.

In at least one embodiment, the image capturing device 30 is mounted above the display device 40. Then, the image capturing device 30 can capture face of the user.

In at least one embodiment, the uploading module 102 can upload a first user image to the server 2. It should be noted that the image capturing device 30 captures the first user image when the user enters or connects to the preset scenario.

In at least one embodiment, the electronic device 1 uses a face recognition program, and the face recognition program can upload images. An administrator or user can upload the first user image to the server 2 through the face recognition program. The electronic device 1 also can upload the first user image to the server 2 through the face recognition program automatically. The server 2 can receive the first user image or images, and display first facial rectangles on the users and user information based on the first user image.

In at least one embodiment, the receiving module 103 can receive the first user image which is sent by the server 2. The first user image can include the first facial rectangles and user information.

In at least one embodiment, the face database 201 can store at least one user image and corresponding user information. An administrator of the preset scenario can upload the at least one user image to the server 2. The at least one user image can include identity and information of the user. The user image and information can used to identify and verify the user.

In at least one embodiment, the application programming interface 202 can identify face in first user image through a machine learning algorithm. The application programming interface 202 can display the face by the first facial rectangles. The server 2 can analyze facial features of the first user image by the application programming interface 202. The server 2 can further compare the facial features of the first user image with facial features of each user image stored in the face database 201, and obtain similarities between the facial features of the first user image and facial features of each user image stored in the face database 201. When the similarities are greater than or equal to a predetermined percentage, the server 2 can determine that an identified user is shown in the first user image. The information as to users can include name, sex, and age of the user. For example, the predetermined percentage is 90%.

In at least one embodiment, the server 2 can further send the first user image to the electronic device 1. The first user image can include the displayed first facial rectangles and user information. In at least one embodiment, the server 2 can send a prompt to a user of the first user image that authentication to the electronic device 1 has not issued, when the similarities are less than the predetermined percentage. That is, the receiving module 103 can receive the prompt that the user of the first user image is not authenticated.

In at least one embodiment, the detecting module 104 can detect second facial rectangles of a second user image. The second user image can be any image that the image capturing device 30 captures after the first user image is captured.

In at least one embodiment, the detecting module 104 can detect the faces of the second user image by a multi-task cascaded convolutional networks algorithm.

Figure 2:
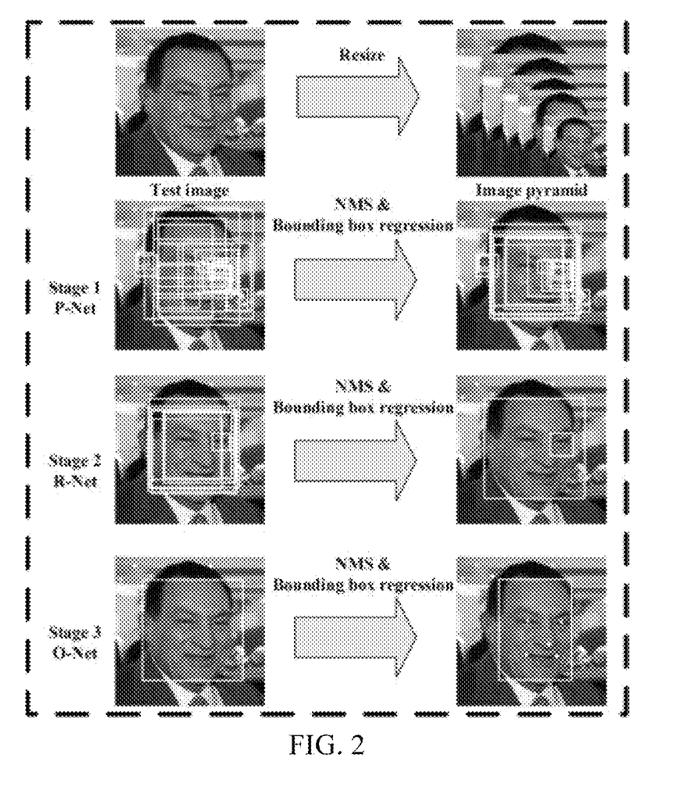
FIG. 2 illustrates a schematic diagram of the detection of a face of a second user image by using a concatenated convolutional neural network algorithm.

Refer to FIG. 2, the detecting module 104 can scale the second user image to a different size to generate an image pyramid of the second user image. The detecting module 104 can perform three stages of processing on the second user image. The three stages of processing can include first, second, and third stages. The first stage can use a proposal network (P-Net) to process the second user image and output candidate facial rectangles. In the first stage, the detecting module 104 can generate candidate facial rectangles of faces of the second user image and bounding box regression vectors by a full convolutional network based on the second user image. The detecting module 104 can correct the candidate facial rectangles by a bounding box regression algorithm. The detecting module 104 can further combine overlapping candidate facial rectangles by a non-maximum suppression algorithm.

In at least one embodiment, the second stage can use a refine network (R-Net) to process the second user image. In the second stage, the detecting module 104 can delete wrong facial rectangles by inputting the candidate facial rectangles to the refine network. The detecting module 104 can further correct the remaining candidate facial rectangles by the bounding box regression algorithm, and can combine overlapping candidate facial rectangles by the non-maximum suppression algorithm.

In at least one embodiment, the third stage can use an output network (O-Net) to process the second user image. In the third stage, the detecting module 104 can output the processed second user image. The processed second user image can include at least one second facial rectangle and facial feature dots corresponding to the second facial rectangle. In the present embodiment, there are five facial feature dots on the second facial rectangle. The five facial feature dots are located at positions corresponding to two eyes, nose, and mouth of the second user image.

In at least one embodiment, the determining module 105 can determine whether the number of faces of the second user image is equal to the number of faces of the first user image.

In at least one embodiment, the determining module 105 can compare the number of second facial rectangles of the second user image with the number of first facial rectangles of the first user image to determine whether the number of faces of the second user image is equal to the number of faces of the first user image. When the rectangle numbers are equal, the determining module 105 can determine that the number of faces of the second user image is equal to the number of faces of the first user image. When the number of second facial rectangles of the second user image is different from the number of first facial rectangles of the first user image, the determining module 105 can determine that the number of faces of the second user image is different from the number of faces of the first user image.

In at least one embodiment, the uploading module 102 can send the second user image to the server 2 if the number of faces of the second user image is equal to the number of faces of the first user image. The server 2 will recognize one or more third facial rectangle of the second user image. The receiving module 103 can receive the second user image with the second facial rectangles and the third facial rectangles.

In at least one embodiment, the confirming module 106 can obtain a number of distances by calculating distance between the third facial rectangle and the second facial rectangle of each user of the second user image, and determine whether each of the number of distances are less than or equal to a preset value.

In at least one embodiment, the distance between the third facial rectangle and the second facial rectangle of each user of the second user image can be a Euclidean distance. That is, the confirming module 106 can determine whether the Euclidean distance between the third facial rectangle and the second facial rectangle of each user of the second user image is less than or equal to the preset value.

Figure 3:
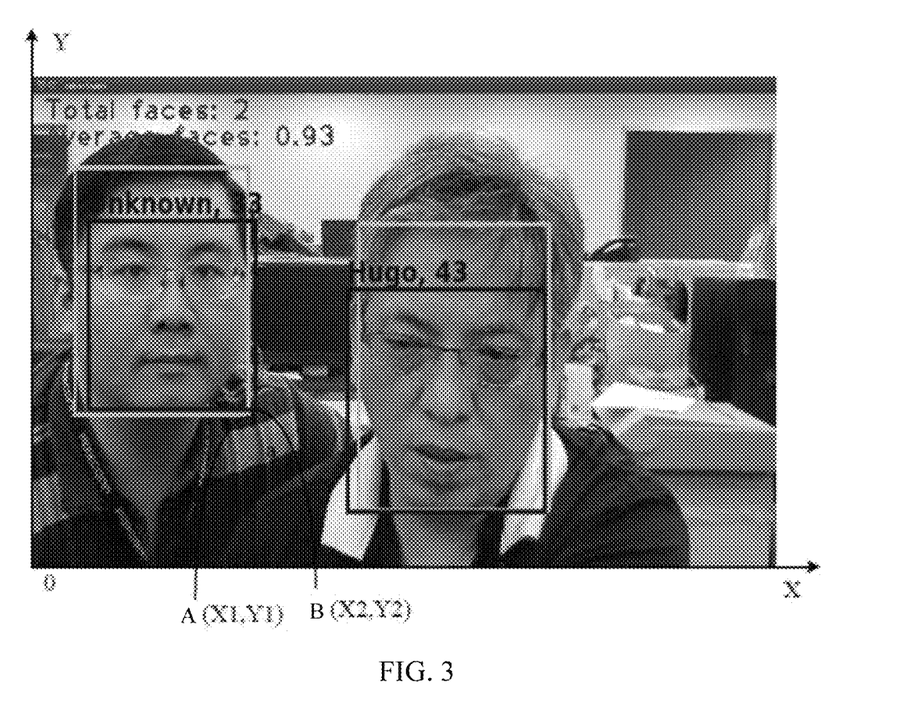
FIG. 3 illustrates a schematic diagram of facial rectangles applied to second user image.

In FIG. 3, light color frame represents the second facial rectangle detected by the detecting module 104, and dark color frame represents the third facial rectangle recognized by the server 2. The confirming module 106 can determine a number of (e.g., four) endpoints of the second facial rectangle, and a number of (e.g., four) endpoints of the third facial rectangle. The confirming module 106 can select one endpoint of the second facial rectangle, and one endpoint of the third facial rectangle. The position of the endpoint of the second facial rectangle corresponds to the position of the endpoint of the third facial rectangle. For example, the endpoint of the second facial rectangle may be located on upper left corner of the second facial rectangle, and the endpoint of the third facial rectangle maybe located on upper left corner of the third facial rectangle. The endpoint of the second facial rectangle maybe located on lower left corner of the second facial rectangle, and the endpoint of the third facial rectangle maybe located on lower left corner of the third facial rectangle. The endpoint of the second facial rectangle maybe located on upper right corner of the second facial rectangle, and the endpoint of the third facial rectangle maybe located on upper right corner of the third facial rectangle. The endpoint of the second facial rectangle maybe located on lower right corner of the second facial rectangle, and the endpoint of the third facial rectangle maybe located on lower right corner of the third facial rectangle. The confirming module 106 can calculate the relevant distances by Euclidean distance algorithm.

In at least one embodiment, as shown in FIG. 3, the endpoint A is located on lower right corner of the second facial rectangle and endpoint B is located on lower right corner of the third facial rectangle. A plane rectangular coordinate system XOY established in the second user image can be taken as an example to calculate the distance between the endpoint A and endpoint B. The coordinates of the endpoint A are set as (X1, Y1), and the coordinates of the endpoint B are set as (X2, Y2). The distance d between the endpoint A and the endpoint B is calculated by formula $$d=\sqrt{(X1-X2)^2+(Y1-Y2)^2}.$$

In at least one embodiment, the determining module 103 can determine that the users shown in the second image are the same users shown in the first image when the number of distances are less than or equal to the preset value, and may also determine that user information of the second user image is the same as the user information of the first user image when the number of distances are less than or equal to the preset value.

In at least one embodiment, when the number of faces in different user images taken by the electronic device 1 are the same, and the distance of the facial rectangles is small, it is determined that the users shown in different user images are the same. Thus, the server 2 need not perform the identification and verification of the users in the different user images again, which simplifies the process of user identification, and also protects against financial loss in the case where the image recognition provided by the server 2 requires payment.

In at least one embodiment, the uploading module 102 can further send the second user image to the server 2 when the number of the faces of the second user image is different from the number of the faces of the first user image. The server 2 will recognize user information of the second user image, and display the user information on the second user image. For example, as shown in FIG. 3, the server 2 may recognize and identify Hugo in the second user image, he is 43 years old and male according to his information. The server 2 has displayed his name and information on the second user image. The receiving module 103 can further receive the displayed second user image which is sent by the server 2.

In at least one embodiment, the uploading module 102 can send the second user image to the server 2 when at least one Euclidean distance of the number of distances being greater than the preset value exists. The server 2 will recognize user information of the second user image, and display the user information on the second user image. The receiving module 103 can further receive the displayed second user image which is sent by the server 2.

In at least one embodiment, the displaying module 107 can display the user image captured by the image capturing device 30, and the facial rectangles and user information on the display device 40.

In at least one embodiment, the displaying module 107 can display the second facial rectangle and the third facial rectangle on the display unit 40 through an open source computer database (OpenCV). The displaying module 107 can further display user information in the user image recognized by the server 2.

In at least one embodiment, for convenience of identification, the displaying module 107 can control the user information corresponding to a female user of the user image to be displayed in red on the display device 40, and control the user information corresponding to a male user to be displayed in blue on the display device 40.

Figure 4:
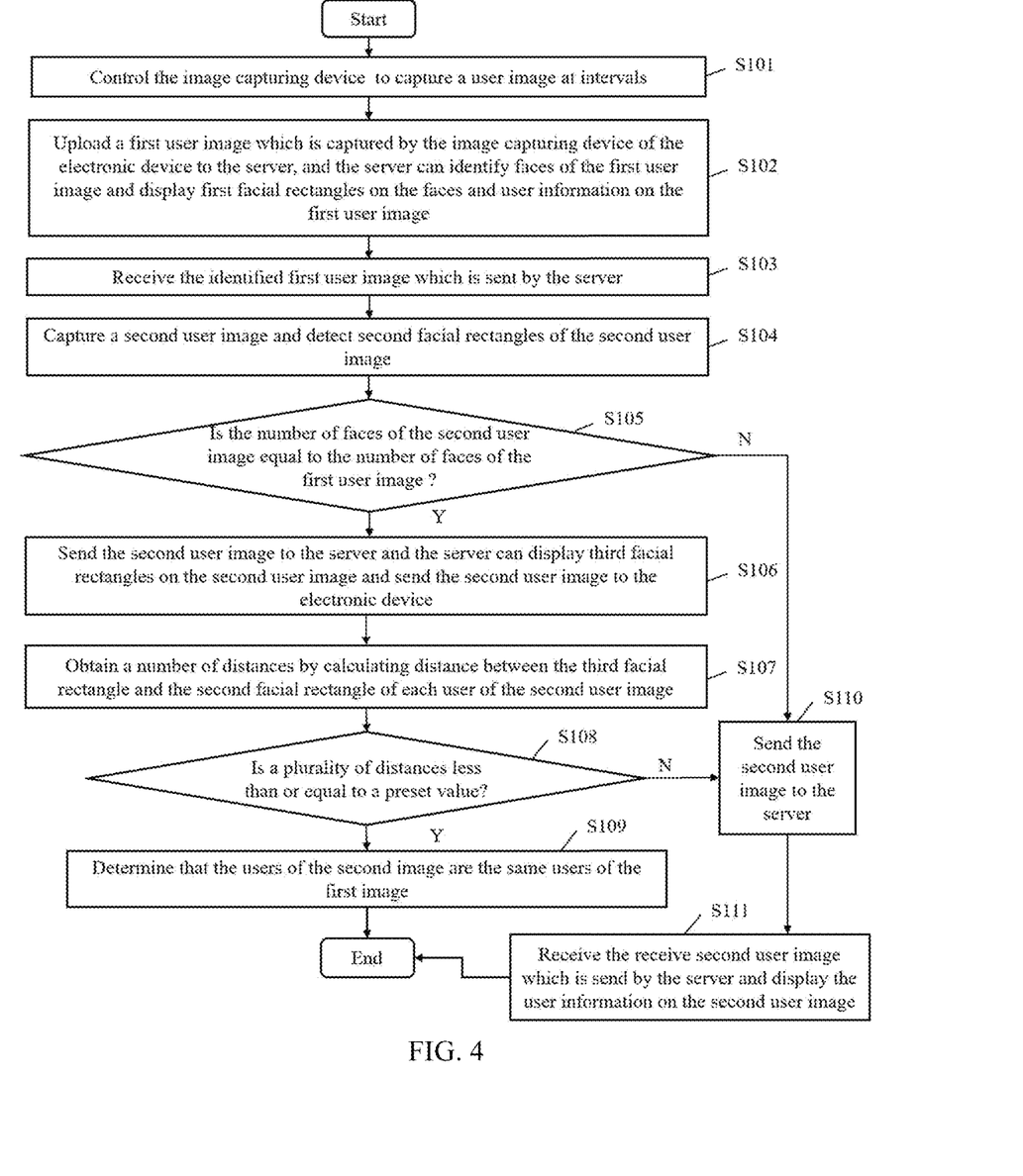
FIG. 4 illustrates a flowchart of one embodiment of a face recognition method applied in the electronic device of FIG. 1.

FIG. 4 illustrates a flowchart of one embodiment of a method for face recognition applied in the electronic device of FIG. 1. In an example embodiment, the method is performed by execution of computer-readable software program codes or instructions by the processor 10 of the electronic device 1.

Referring to FIG. 4, a method is provided by way of example, as there are a variety of ways to carry out the method. The method described below can be carried out using the configurations illustrated in FIG. 1, for example, and various elements of these figures are referenced in explaining method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S101.

At block S101, the photographing module 101 can control the image capturing device 30 to capture a user image at intervals.

At block S102, the photographing module 101 can upload a first user image which is captured by the image capturing device 30 of the electronic device 1 to the server 2, and the server can identify faces of the first user image and display first facial rectangles on the faces and user information on the first user image.

At block S103, the receiving module 103 can receive the identified first user image which is sent by the server 2. The identified first user image includes the first facial rectangles and the user information.

At block S104, the photographing module 101 can capture a second user image, and the detecting module 104 can detect second facial rectangles of the second user image.

At block S105, the determining module 105 can determine whether the number of faces of the second user image is equal to the number of faces of the first user image. When the number of faces of the second user image is equal to the number of faces of the first user image, the process goes to block S106. When the number of faces of the second user image is different the number of faces of the first user image, the process goes to block S110.

At block S106, the uploading module 102 can send the second user image to the server 2, and the server 2 can display third facial rectangles on the second user image and send the second user image to the electronic device 1. The electronic device 1 can receive the second user image and display the user information on the second user image.

At block S107, the confirming module 106 can obtain a number of distances by calculating distance between the third facial rectangle and the second facial rectangle of each user of the second user image.

At block S108, the confirming module 106 can determine whether a plurality of distances is less than or equal to a preset value. When the plurality of distances is less than or equal to a preset value, the process goes to block S109. When at least one distance being greater than the preset value exists, the process goes to block S110.

At block S109, the determining module 103 can determine that the users of the second image are the same users of the first image. Moreover, the user information of the second user image can be determined to be the same as the user information of the first user image when the distance between the first facial rectangle and the second facial rectangle is less than or equal to the preset value.

At block S110, the uploading module 102 can send the second user image to the server 2. Moreover, the server 2 will recognize user information of the second user image and display the user information on the second user image.

At block S111, the receiving module 103 can receive the receive second user image which is send by the server 2, and display the user information on the second user image.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. An electronic device communicating with a server, the electronic device comprising:
   a storage device; and
   at least one processor, wherein
   the storage device storing one or more programs wherein when executed by the at least one processor, cause the at least one processor to:
   upload a first user image captured by an image capturing device of the electronic device to the server for identifying faces of the first user image;
   receive the identified first user image from the server, and the identified first user image comprises a first facial rectangle of each face of the first user image and user information of each face of the first user image;
   capture a second user image and detect a second facial rectangle of each face of the second user image;
   determine whether a number of faces of the second user image is equal to a number of faces of the first user image;
   upload the second user image to the server for identifying one or more third facial rectangle of each face of the second user image when the number of faces of the second user image is equal to the number of faces of the first user image;
   obtain a plurality of distances by calculating at least a distance between the third facial rectangle and the second facial rectangle of each face of the second user image;
   determine whether the plurality of distances is less than or equal to a preset value; and
   determine the users of the second image are the same users of the first image when the plurality of distances is less than or equal to the preset value.

2. The electronic device according to claim 1, wherein whether the number of faces of the second user image is equal to the number of faces of the first user image is determined by a number of the second facial rectangles of the second user image and a number of the first facial rectangles of the first user image;
   the number of faces of the second user image is equal to the number of faces of the first user image if the number of the second facial rectangles of the second user image is equal to the number of the first facial rectangles of the first user image; and
   the number of faces of the second user image is not equal to the number of faces of the first user image if the number of the second facial rectangles of the second user image is not equal to the number of the first facial rectangles of the first user image.

3. The electronic device according to claim 1, wherein the at least one processor is further caused to:
   send the second user image to the server for identifying user information of the second user image and displaying the user information on the second user image when the number of faces of the second user image is not equal to the number of faces of the first user image; and
   receive the second user image and display the user information on the second user image.

4. The electronic device according to claim 1, wherein the distance between the third facial rectangle and the second facial rectangle of each face of the second user image is calculated by:
   determining a plurality of endpoints of the second facial rectangle and a plurality of endpoints of the third facial rectangle;
   selecting one endpoint of the second facial rectangle and one endpoint of the third facial rectangle, wherein position of the selected endpoint of the second facial rectangle corresponds to the position of the selected endpoint of the third facial rectangle; and
   calculating a distance between the selected endpoint of the second facial rectangle and the selected endpoint of the third facial rectangle by an Euclidean distance algorithm.

5. The electronic device according to claim 1, wherein the at least one processor is further caused to:

send the second user image to the server for identifying user information of the second user image and displaying the user information on the second user image when at least one distance of the plurality of distances being greater than the preset value exists; and receive the second user image and display the user information on the second user image.

6. A face recognizing method applicable in an electronic device, the electronic device communicating with a server, the method comprising:

uploading a first user image captured by an image capturing device of the electronic device to the server for identifying faces of the first user image;

receiving the identified first user image from the server, and the identified first user image comprises a first facial rectangle of each face of the first user image and user information of each face of the first user image;

capturing a second user image and detect a second facial rectangle of each face of the second user image;

determining whether a number of faces of the second user image is equal to a number of faces of the first user image;

uploading the second user image to the server for identifying one or more third facial rectangle of each face of the second user image when the number of faces of the second user image is equal to the number of faces of the first user image;

obtaining a plurality of distances by calculating at least a distance between the third facial rectangle and the second facial rectangle of each user of the second user image;

determining whether the plurality of distances is less than or equal to a preset value; and determining that users of the second image are the same users of the first image when the plurality of distances is less than or equal to the preset value.

7. The method according to claim 6, wherein whether the number of faces of the second user image is equal to the number of faces of the first user image is determined by a number of the second facial rectangles of the second user image and a number of the first facial rectangles of the first user image;

the number of faces of the second user image is equal to the number of faces of the first user image if the number of the second facial rectangles of the second user image is equal to the number of the first facial rectangles of the first user image; and the number of faces of the second user image is not equal to the number of faces of the first user image if the number of the second facial rectangles of the second user image is not equal to the number of the first facial rectangles of the first user image.

8. The method according to claim 6, wherein the method further comprises:

sending the second user image to the server for identifying user information of the second user image and displaying the user information on the second user image when the number of faces of the second user image is not equal to the number of faces of the first user image; and receiving receive the second user image and displaying the user information on the second user image.

9. The method according to claim 6, wherein the distance between the third facial rectangle and the second facial rectangle of each face of the second user image is calculated by:

determining a plurality of endpoints of the second facial rectangle and a plurality of endpoints of the third facial rectangle;

selecting one endpoint of the second facial rectangle and one endpoint of the third facial rectangle, wherein a position of the selected endpoint of the second facial rectangle corresponds to a position of the selected endpoint of the third facial rectangle; and calculating at least a distance between the selected endpoint of the second facial rectangle and the selected endpoint of the third facial rectangle by an Euclidean distance algorithm.

10. The method according to claim 6, wherein the method further comprises:

sending the second user image to the server for identifying user information of the second user image and displaying the user information on the second user image when at least one distance of the plurality of distances being greater than the preset value exists; and receiving the second user image and displaying the user information on the second user image.

11. A non-transitory storage medium having stored thereon instructions that, when executed by a processor of an electronic device, causes the processor to perform a face recognition method, the electronic device communicating with at least one bus, the method comprising:

uploading a first user image captured by an image capturing device of the electronic device to the server for identifying faces of the first user image;

receiving the identified first user image from the server, and the identified first user image comprises a first facial rectangle of each face of the first user image and user information of each face of the first user image;

capturing a second user image and detect a second facial rectangle of each face of the second user image;

determining whether a number of faces of the second user image is equal to a number of faces of the first user image;

uploading the second user image to the server for identifying one or more third facial rectangle of each face of the second user image when the number of faces of the second user image is equal to the number of faces of the first user image;

obtaining a plurality of distances by calculating at least a distance between the third facial rectangle and the second facial rectangle of each user of the second user image;

determining whether the plurality of distances is less than or equal to a preset value; and determining that users of the second image are the same users of the first image when the plurality of distances is less than or equal to the preset value.

12. The non-transitory storage medium according to claim 11, wherein whether the number of faces of the second user image is equal to the number of faces of the first user image is determined by a number of the second facial rectangles of the second user image and a number of the first facial rectangles of the first user image;

the number of faces of the second user image is equal to the number of faces of the first user image if the number of the second facial rectangles of the second user image is equal to the number of the first facial rectangles of the first user image; and the number of faces of the second user image is not equal to the number of faces of the first user image if the number of the second facial rectangles of the second user image is not equal to the number of the first facial rectangles of the first user image.

13. The non-transitory storage medium according to claim 12, wherein the method further comprises:
   sending the second user image to the server for identifying user information of the second user image and displaying the user information on the second user image when the number of faces of the second user image is not equal to the number of faces of the first user image; and
   receiving receive the second user image and displaying the user information on the second user image.

14. The non-transitory storage medium according to claim 11, wherein the distance between the third facial rectangle and the second facial rectangle of each face of the second user image is calculated by:
   determining a plurality of endpoints of the second facial rectangle and a plurality of endpoints of the third facial rectangle;
   selecting one endpoint of the second facial rectangle and one endpoint of the third facial rectangle, wherein a position of the selected endpoint of the second facial rectangle corresponds to a position of the selected endpoint of the third facial rectangle; and
   calculating at least a distance between the selected endpoint of the second facial rectangle and the selected endpoint of the third facial rectangle by an Euclidean distance algorithm.

15. The non-transitory storage medium according to claim 11, wherein the method further comprises:
   sending the second user image to the server for identifying user information of the second user image and displaying the user information on the second user image when at least one distance of the plurality of distances being greater than the preset value exists; and
   receiving the second user image and displaying the user information on the second user image.

* * * * *